(12) United States Patent
Lee et al.

(10) Patent No.: US 9,116,570 B2
(45) Date of Patent: Aug. 25, 2015

(54) TOUCH DISPLAY APPARATUS SENSING TOUCH FORCE

(71) Applicant: Samsung Display Co., Ltd., Yongin, Gyeonggi-Do (KR)

(72) Inventors: Kangwon Lee, Hwaseong-si (KR); Won-ki Hong, Suwon-si (KR); Moonsung Choi, Incheon (KR); Seungho Nam, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 184 days.

(21) Appl. No.: 13/763,451

(22) Filed: Feb. 8, 2013

(65) Prior Publication Data

US 2014/0055407 A1 Feb. 27, 2014

(30) Foreign Application Priority Data

Aug. 24, 2012 (KR) .................. 10-2012-0092916

(51) Int. Cl.
*G06F 3/041* (2006.01)
*G06F 3/044* (2006.01)

(52) U.S. Cl.
CPC .............. *G06F 3/0414* (2013.01); *G06F 3/044* (2013.01); *G06F 3/0416* (2013.01); *G06F 2203/04106* (2013.01)

(58) Field of Classification Search
CPC ............. G06F 3/0487; G06F 2203/04105; G06F 3/0414; G06F 3/045; G06F 2203/04113; G06F 2203/04106; G06F 3/041; G06F 3/044; G01L 9/06; G01L 9/08
USPC .................................. 345/173–178
See application file for complete search history.

(56) References Cited

U.S. PATENT DOCUMENTS

| 7,864,503 B2 | 1/2011 | Chang |
| 8,237,672 B2 | 8/2012 | Jiang et al. |
| 2009/0153509 A1* | 6/2009 | Jiang et al. ................. 345/173 |

(Continued)

FOREIGN PATENT DOCUMENTS

| JP | 2010-020769 A | 1/2010 |
| JP | 2011-040052 A | 2/2011 |

(Continued)

OTHER PUBLICATIONS

Kangwon Lee, "Carbon nanotube film piezoresistor embedded in polymer membranes;" Applied Physics Letters pp. 013511 issued on Jan. 7, 2010.

*Primary Examiner* — Gerald Johnson
*Assistant Examiner* — Christopher Kohlman
(74) *Attorney, Agent, or Firm* — Innovation Counsel LLP (57) ABSTRACT

A touch display device is provided which includes a display panel for displaying an image, and a touch screen panel disposed on the display panel and configured to sense at least one touch. The touch screen panel includes a touch substrate at which the touch can be generated; sensing electrodes provided on the touch substrate and spaced apart from one another, each of the sensing electrodes being formed of a piezoresistive material having a resistance value that varies according to an applied force; and a touch processor electrically connected to the sensing electrodes. The touch processor extracts a touch coordinate based on time constants of sensing signals applied to the sensing electrodes, and calculates a touch force of the touch based on resistance values of the sensing electrodes.

20 Claims, 8 Drawing Sheets

(56) References Cited

U.S. PATENT DOCUMENTS

| | | |
|---|---|---|
| 2009/0267916 A1 | 10/2009 | Hotelling |
| 2010/0007619 A1 | 1/2010 | Jiang et al. |
| 2010/0156818 A1 | 6/2010 | Burrough et al. |
| 2011/0304571 A1* | 12/2011 | Kim et al. ............... 345/173 |
| 2012/0013573 A1 | 1/2012 | Liu et al. |
| 2012/0075238 A1* | 3/2012 | Minami et al. .......... 345/174 |
| 2012/0092291 A1* | 4/2012 | Park et al. ............... 345/174 |
| 2012/0113014 A1* | 5/2012 | Yilmaz .................... 345/173 |
| 2012/0182254 A1* | 7/2012 | Jang et al. ............... 345/174 |
| 2012/0256838 A1* | 10/2012 | Lee et al. ................ 345/168 |
| 2012/0306792 A1* | 12/2012 | Powers .................... 345/173 |
| 2014/0210760 A1* | 7/2014 | berg et al. ............... 345/173 |

FOREIGN PATENT DOCUMENTS

| | | |
|---|---|---|
| KR | 100801497 B1 | 1/2008 |
| KR | 1020080063194 A | 7/2008 |
| KR | 1020090041793 A | 4/2009 |
| KR | 1020110075134 A | 7/2011 |
| KR | 101082379 B1 | 11/2011 |
| KR | 101133141 B1 | 4/2012 |

* cited by examiner

TOUCH DISPLAY APPARATUS SENSING TOUCH FORCE

CROSS-REFERENCE TO RELATED APPLICATIONS

This application claims the benefit under 35 U.S.C. §119 (a) of Korean Patent Application No. 10-2012-0092916, filed on Aug. 24, 2012 in the Korean Intellectual Property Office, the entire contents of which are hereby incorporated by reference.

BACKGROUND

Embodiments of the present invention relate generally to touch display devices. More particularly, embodiments of the present invention relate to touch display devices capable of sensing a touch force using a piezoresistive material.

Functions of information display devices such as cellular phones, PDAs, navigation systems, etc. may be expanded into multimedia providing fields. Conventional information display devices may use key pads as input means. Recent information display devices employ a touch screen panel as input means to forego a keyboard and provide a larger display screen. A touch screen panel may be attached to the display panel of an information display device.

While a conventional touch screen panel senses the location of a touch input by a user, it may not sense a force applied by the user. The conventional touch screen panel may require a separate force sensor for sensing a force applied by the user. This may cause an increase in a production cost.

SUMMARY

A touch display device according to an embodiment of the inventive concept comprises a display panel, and a touch screen panel disposed on the display panel and configured to sense at least one touch. The touch screen panel comprises a touch substrate, sensing electrodes, and a touch processor.

The touch substrate can be formed of a flexible insulation material.

The sensing electrodes are provided on the touch substrate to be spaced apart from one another, and each of the sensing electrodes can comprise a piezoresistive material having a resistance that varies according to an applied force. The piezoresistive material can be carbon nanotube (CNT) or graphene.

The touch processor is electrically connected to the sensing electrodes. The touch processor can be configured to extract a touch coordinate of the touch based on time constants of sensing signals applied to the sensing electrodes, and to calculate a touch force of the touch based on resistance values of the sensing electrodes.

The touch processor can comprise a signal providing unit configured to provide the sensing signals to the sensing electrodes; and a signal processing unit configured to determine the time constants of the sensing signals so as to facilitate output of the touch coordinate and the touch force.

The signal processing unit can comprise a touch determining part configured to determine the presence of the touch and to determine whether the touch is a soft touch or a hard touch, by comparing the time constants to a predetermined reference time constant; a coordinate extracting part configured to extract the touch coordinate from locations of sensing electrodes whose respective sensing signals have time constants corresponding to the touch, and a touch force calculating part configured to calculate the touch force based on a resistance value of a sensing electrode corresponding to the touch coordinate.

A touch display device is configured as that according to an embodiment of the inventive concept except for a touch processor. The touch processor is electrically connected to the sensing electrodes and is configured to extract a touch coordinate and a touch force of the touch based on resistance values of the sensing electrodes.

The touch processor comprises an electrode resistor providing resistance values of the sensing electrodes; a reference resistor connected in series to the electrode resistor and having a substantially constant resistance value; and a touch determining part connected to a node between the electrode resistor and the reference resistor and configured to determine the presence of a touch as well as whether the touch is a soft touch or a hard touch based on a division voltage at the node; a coordinate extracting part configured to extract the touch coordinate from a location of a sensing electrode corresponding to the division voltage; and a touch force calculating part configured to calculate the touch force based on a resistance value of a sensing electrode corresponding to the touch coordinate.

BRIEF DESCRIPTION OF THE FIGURES

The above and other objects and features will become apparent from the following description with reference to the following figures, wherein like reference numerals refer to like parts throughout the various figures unless otherwise specified.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
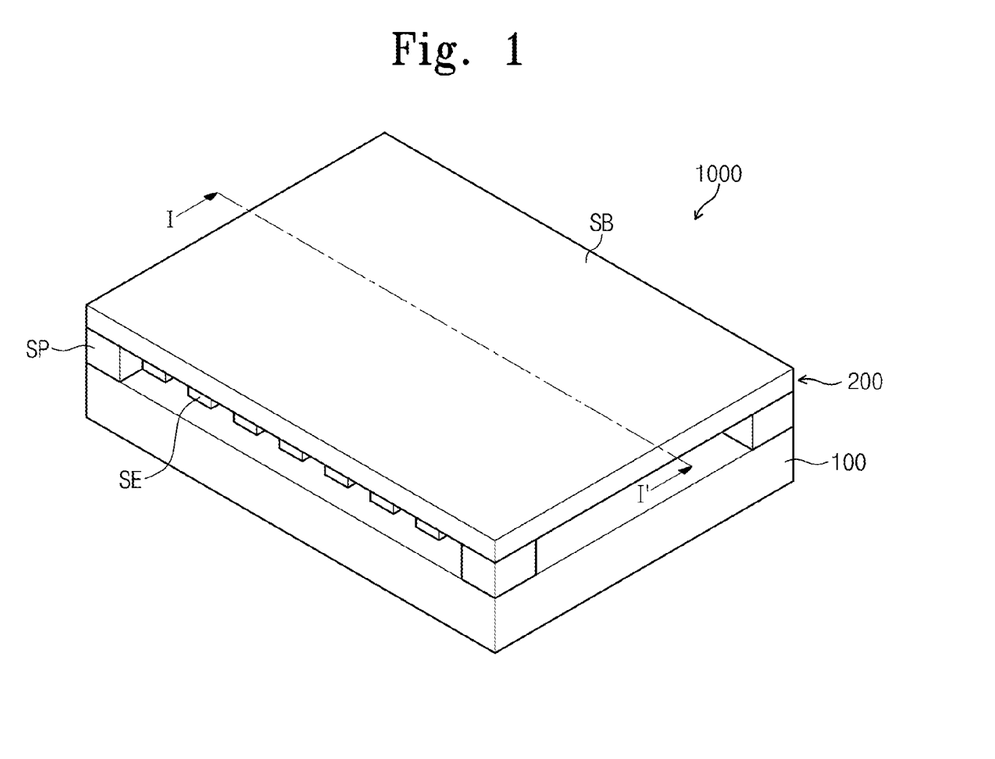
FIG. 1 is a perspective view of a touch display device according to an embodiment of the inventive concept.
Figure 2:
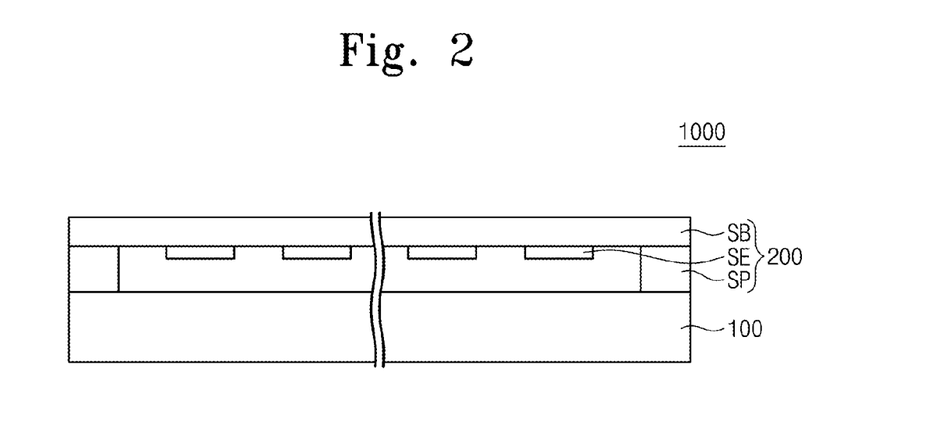
FIG. 2 is a cross-sectional view taken along a line I-I' in FIG. 1.

FIG. 1 is a perspective view of a touch display device according to an embodiment of the inventive concept. FIG. 2 is a cross-sectional view taken along a line I-I' in FIG. 1.

Referring to FIGS. 1 and 2, a touch display device 1000 may include a display panel 100) and a touch screen panel 200.

The display panel 100 may display images. The display panel 100 may any type of display panel, such as a liquid crystal display panel, an organic light emitting display panel, a plasma display panel, an electrophoretic display panel, an electro-wetting display panel, and so on.

A shape of the display panel 100 in a plane view (i.e. a view along a normal to the image-displaying face of display panel 100) is not necessarily limited to any specific shape. In FIGS. 1 and 2, there is illustrated an example in which a shape of the display panel 100 is rectangular in a plane view.

The touch screen panel 200) may include a touch substrate SB, sensing electrodes SE, and a touch processor (not shown).

The touch substrate SB may be used to sense the touch of a user. The touch substrate SB may be formed of a flexible material such as plastic.

The touch substrate SB may have a plate shape. More specifically, the touch substrate SB may have a platelike shape corresponding to a shape of the display panel 100. In FIGS. 1 and 2, there is illustrated an example in which the shape of the touch substrate SB is rectangular in a plane view.

The sensing electrodes SE may be disposed on the touch substrate SB. The sensing electrodes SE may be spaced apart from one another. In addition, the sensing electrodes SE may have island shape, respectively. The sensing electrodes SE may be formed of a piezoresistive material, the resistance value of which varies according to a force applied thereto. For example, the piezoresistive material may be carbon nanotube (CNT), graphene, or the like. The carbon nanotube may be Single Walled Carbon Nanotubes (SWNT) or Multi Walled Carbon Nanotubes (NWNT). In the case that the piezoresistive material is pressed, its conductivity may decrease and its resistance value may increase.

The piezoresistive material may be substantially transparent. Light incident onto the sensing electrodes SE may largely pass through the sensing electrodes SE. Thus, although the sensing electrodes SE are disposed to be overlapped with the display panel 100 in a plane view, brightness of an image displayed by the display panel 100 may not be substantially affected.

The touch screen panel 200 may further comprise a plurality of spacers SP. In FIGS. 1 and 2, there is illustrated an example in which four spacers SP are disposed at four corners of the touch substrate SB, respectively. However, any number and placement of spacers is contemplated.

The spacers SP may be disposed between the touch substrate SB and the display panel 100. The spacers SP may perform the role of maintaining a cell gap between the touch substrate SB and the display panel 100.

Heights of the spacers SP may be greater than those of the sensing electrodes SE. Thus, the sensing electrodes SE may be spaced apart from the display panel 100 in a height direction. A space between the touch substrate SB and the display panel 100 (i.e. the space within which the sensing electrodes SE reside) may be filled by air.

Although not shown in the figures, the touch processor may be mounted on the touch screen panel 200 as a chip type processor, or may be provided on a printed circuit board connected with the touch screen panel 200.

Figure 3:
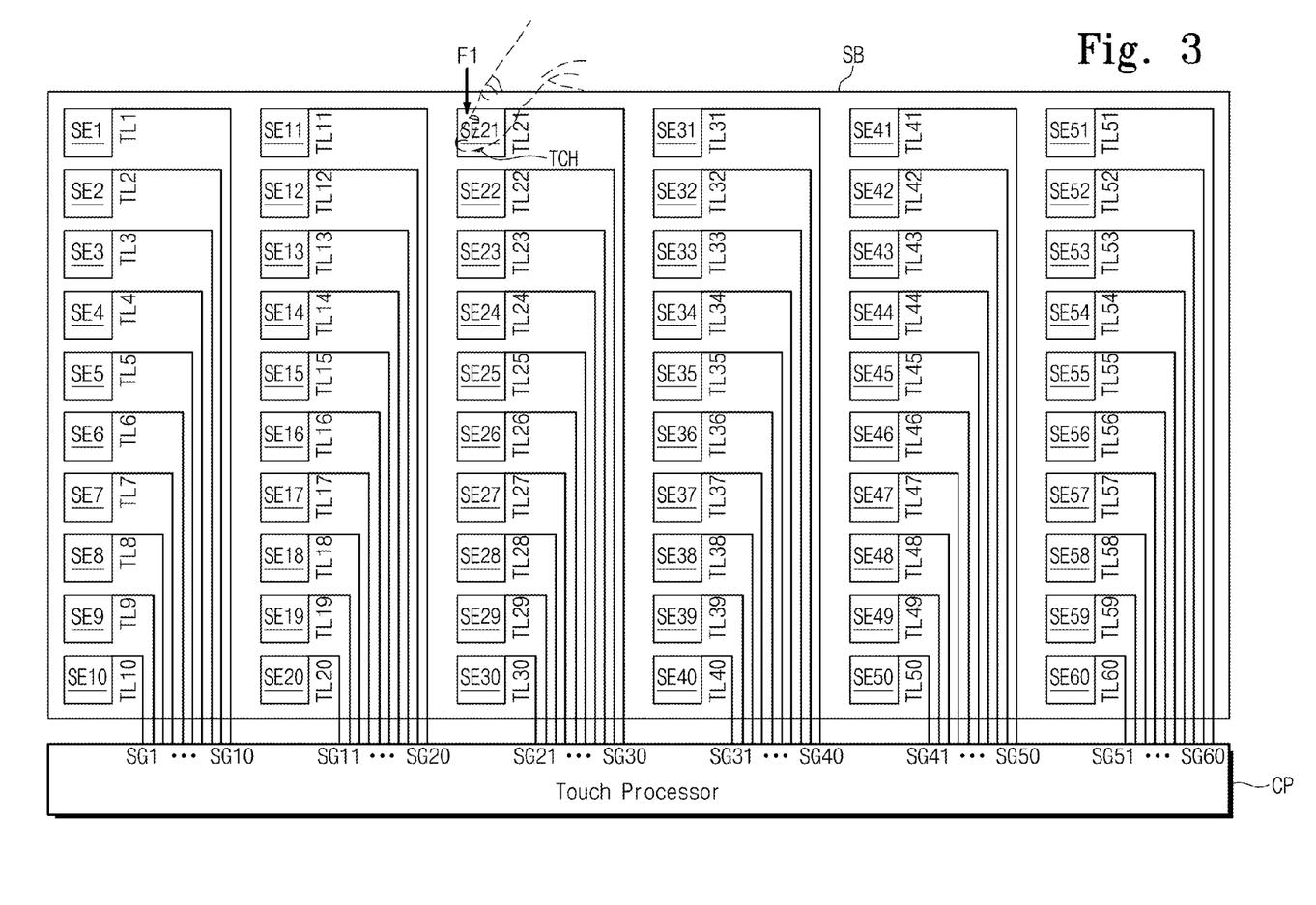
FIG. 3 is a top view of a touch screen panel.
Figure 4:
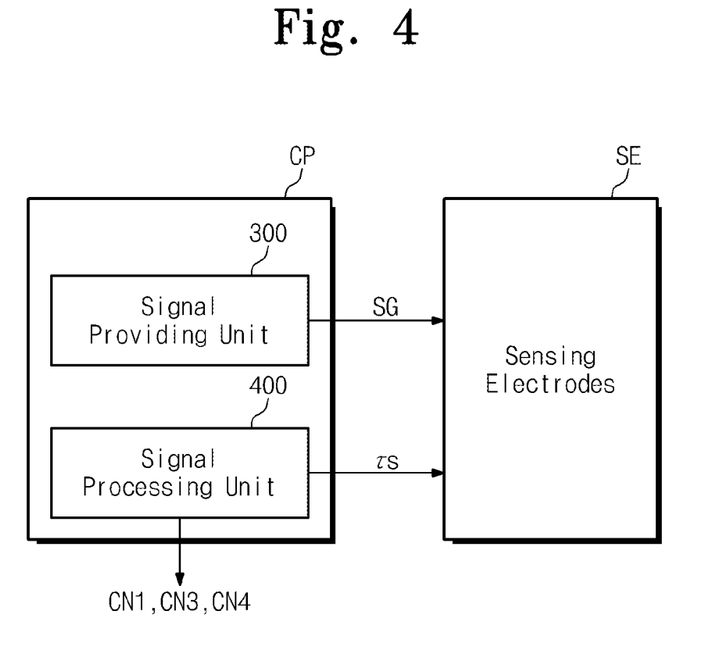
FIG. 4 is a block diagram schematically illustrating a touch screen panel.

FIG. 3 is a top view of a touch screen panel. FIG. 4 is a block diagram schematically illustrating a touch screen panel. In FIG. 3, there is illustrated an example in which a touch TCH is made at a touch substrate SB by a user. Herein, the touch TCH may be generated on 21th sensing electrode SE21 in a plane view, and a touch force F1 corresponding to the touch TCH may be applied in a direction perpendicular to the touch screen SB, i.e. into the touch screen panel.

Referring to FIGS. 3 and 4, sensing electrodes SE may be arranged in a matrix of i rows and j columns (i and j being a natural number). In FIG. 3, there is illustrated an example in which sensing electrodes SE1 to SE60) are arranged in a matrix of 6 rows and 10 columns. Also, each of the sensing electrodes SE1 to SE60 may be rectangular in a plane view.

The touch screen panel 200 may further include touch lines TL1 to TL60 provided on the touch substrate SB. The touch lines TL1 to TL60 may connect the sensing electrodes SE1 to SE60 to a touch processor CP.

A part of the touch lines connected to sensing electrodes of a kth column (k being a natural number satisfying i≤k≤j) may be disposed between the sensing electrodes of the kth column and the adjacent (k+1)th column. In FIG. 3, touch lines TL1 to TL10 connected to sensing electrodes SE1 to SE10 of a first column may be disposed between the sensing electrodes SE1 to SE10 of the first column and sensing electrodes SE11 to SE20 of a second column. The touch lines TL1 to TL60 may be extended in a column direction.

The touch processor CP may include a signal providing unit 300 and a signal processing unit 400.

The signal providing unit 300 may sequentially provide sensing signals SG to the sensing electrodes SE. The sensing signals SG may be current signals or voltage signals. In FIG. 3, there is illustrated an example in which sensing signals SG1 to SG60 are provided to the sensing electrodes SE1 to SE60, respectively.

The signal processing unit 400 may sense sensing time constants τs which are time constants of the sensing signals SG provided to the sensing electrodes SE (i.e., measures of the amount of time the voltage across the sensing electrode SE takes to reach a certain level). At this time, a sensing time constant of a sensing signal SG21 provided to a sensing electrode SE21 located at a point where the touch TCH is generated may be different from a sensing time constant of each of sensing signals SG1 to SG20 and SG22 to SG60 located at points where the touch TCH is not generated.

In particular, if the touch TCH is generated, a touch capacitor may be generated between a user and a 21st sensing electrode SE21. This generated touch capacitor may be connected in parallel with an inherent capacitor of the 21st sensing electrode SE21. The combined capacitance of the touch and inherent capacitors may be larger than that of the inherent capacitance, and a sensing time constant of a sensing signal SG21 provided to the 21st sensing electrode SE21 may be greater than that when the touch TCH is not generated.

The signal processing unit 400 may extract a touch coordinate of the touch TCH, and may calculate a touch force of the touch TCH to provide it to the display panel 100.

Figure 5:
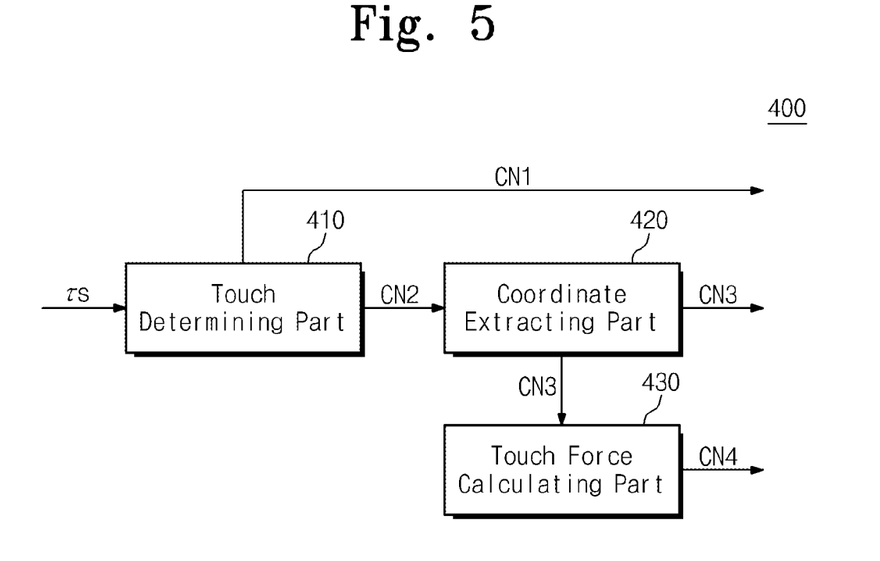
FIG. 5 is a block diagram schematically illustrating a signal processing unit in FIG. 4.
Figure 6:
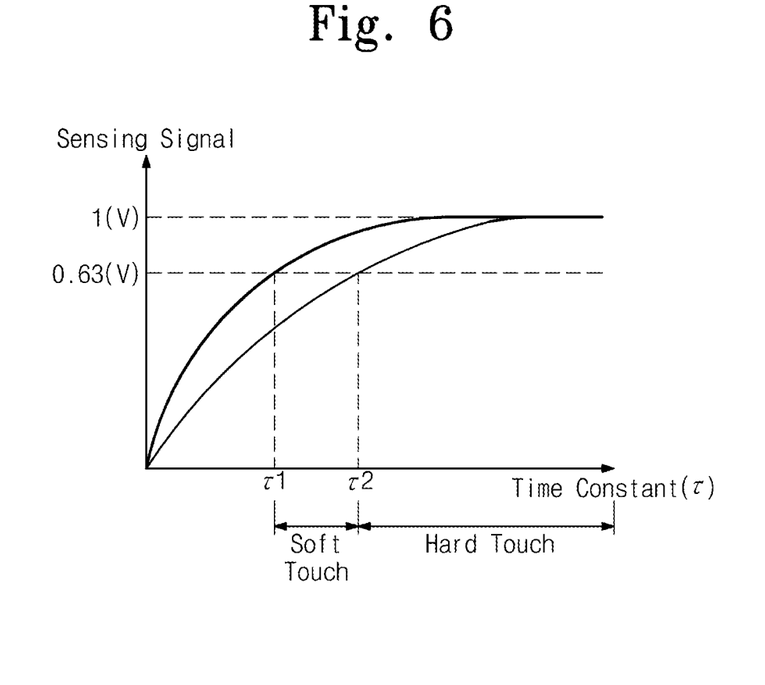
FIG. 6 is a diagram illustrating a waveform of a sensing signal having a reference time constant.
Figure 7:
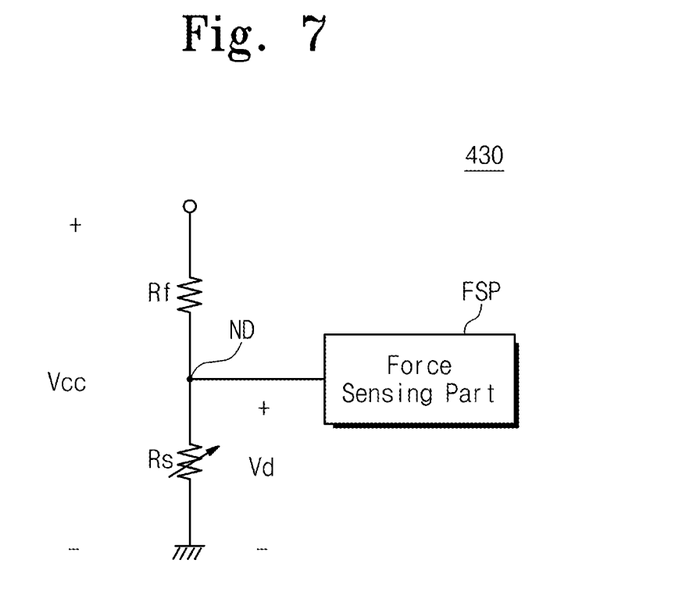
FIG. 7 is a circuit diagram of a touch force calculating unit.

FIG. 5 is a block diagram schematically illustrating the signal processing unit 400 of FIG. 4. FIG. 6 is a diagram illustrating a waveform of a sensing signal having a reference time constant. FIG. 7 is a circuit diagram of a touch force calculating unit. In FIG. 6, a sensing signal may be assumed to be a voltage signal.

Referring to FIG. 5, a signal processing unit 400 may include a touch determining part 410, a coordinate extracting part 420, and a touch force calculating part 430.

The touch determining part 410 may determine whether a touch is generated and whether the touch is a soft touch or a hard touch. This may be determined by comparing a sensing time constant τs to a predetermined reference time constant.

Referring to FIG. 6, the reference time constant may include a first reference time constant τ1 and a second reference time constant τ2. That the sensing time constant τs is larger than the first time constant τ1 may mean that a touch is generated. In the event that the sensing time constant is larger than the first time constant τ1 and smaller than the second time constant τ2, the touch determining part 410 may determine the touch be a soft touch. In the event that the sensing time constant τs is larger than the second time constant τ2, the touch determining part 410 may determine the touch be a hard touch.

Returning to FIG. 5, the touch determining part 410 may provide the display panel 100 with a first control signal CN1 indicating that no touch is generated.

When a touch is generated, the touch determining part 410 may provide the coordinate extracting part 420 with a second control signal CN2 including information associated with a soft/hard touch.

The coordinate extracting part 420 may extract the touch coordinate from a location of a sensing electrode corresponding to the sensing time constant. That is, the time constants for each sensing electrode are determined, and a touch is deemed to have occurred at a particular sensor when its time constant grows greater than τ1 and/or τ2.

Referring to FIGS. 3 and 6, in the case that a sensing time constant τs of a sensing signal SG21 applied to a 21st sensing electrode SE21 becomes larger than the first reference time constant τ1, the coordinate extracting part 420 may decide a location of the 21st sensing electrode SE21 as a touch coordinate.

The coordinate extracting part 420 may provide the display panel 100 with a third control signal CN3 including information associated with the touch coordinate. A display panel illustrated in FIGS. 1 and 2 may receive the third control signal CN3 to convert it into an image such that information directed by the touch coordinate is displayed. Also, when the touch is a hard touch, the coordinate extracting part 420 may provide the third control signal CN3 to the touch force calculating part 430.

The touch force calculating part 430 may calculate the touch force based on a resistance value of a sensing electrode corresponding to the touch coordinate.

Referring to FIGS. 3 and 7, the touch force calculating part 430 may include an electrode resistor Rs, a reference resistor Rf, and a force sensing part FSP.

The electrode resistor Rs may have the same resistance value as that of each of the sensing electrodes SE1 to SE60. In more detail, the electrode resistor Rs may be an equivalent resistor of the sensing electrodes SE1 to SE60 seen from the touch force calculating part 430. That is, resistor Rs is an adjustable resistor whose resistance value is set to the resistance value of the sensing electrode that is receiving the touch force F1. The resistance value of the piezoresistive element is determined from the change in its sensing signal due to the touch, and Rs is set accordingly.

Thus, a resistance value of the electrode resistor Rs may vary when a resistance value of the sensing electrodes SE1 to SE60 is varied by the touch force F1.

The reference resistor Rf may be connected in series with the electrode resistor Rs, and may have a constant resistance value.

The resistors Rf and Rs may be connected in series between a setup voltage Vcc and a ground. One end of the reference resistor Rf may be connected to a reference potential Vcc, one end of the electrode resistor Rs may be grounded, and the other ends of the resistors Rf and Rs may be connected to each other.

The force sensing part FSP may be connected to a connection node of the resistors Rf and Rs. The force sensing part FSP may sense a division voltage Vd decided by dividing the reference potential Vcc using the resistors Rf and Rs. The division voltage Vd may vary according to a variation in a resistance value of the electrode resistor Rs.

The division voltage Vd may be decided by the following equation 1.

$$Vd = Vcc \times \frac{Rs}{Rf + Rs}$$

Herein, Vd, Vcc, Rf, and Rs may indicate a division voltage, a reference potential, a resistance value of a reference resistor, and a resistance value of an electrode resistor, respectively.

The force sensing part FSP may calculate the touch force F1 based on the division voltage Vd.

For example, in the case that a force is not applied to a 21st sensing electrode SE21, a resistance value of the electrode resistor Rs may be infinite. In the case that an infinite force is applied to the 21th sensing electrode SE21, a resistance value of the electrode resistor Rs may be zero. As a resistance value of the electrode resistor Rs varies, the division voltage Vd may vary between 0V and Vcc.

The force sensing part FSP may include a lookup table including force values respectively corresponding to voltage values between 0V and Vcc. The force sensing part FSP may read a touch force F1 corresponding to the division voltage Vd from the lookup table. However, the inventive concept is not limited thereto. For example, the force sensing part FSP may be configured to calculate the touch force F1 from the division voltage Vd using an appropriate coefficient.

The touch force calculating part 430 may provide the display panel 100 with a fourth control signal CN4 having information associated with the touch force F1. That is, the touch force is calculated as above, and fourth control signal CN4 transmits this touch force information. The display panel 100 illustrated in FIGS. 1 and 2 may receive the fourth control signal CN4 to convert it into an image such that information directed by the touch force F1 is displayed.

With a display device of the inventive concept, since sensing electrodes are formed of a piezoresistive material, it is possible to calculate a touch coordinate and a touch force applied by a user without a sensor for measuring a force.

Figure 8:
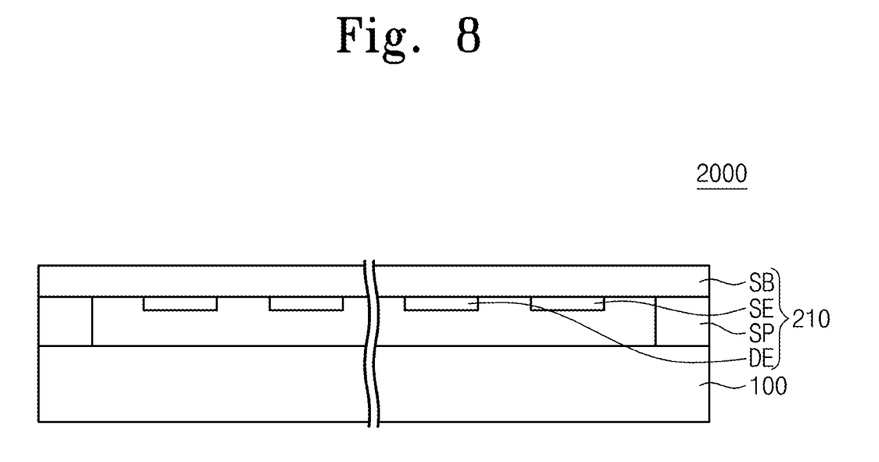
FIG. 8 is a cross-sectional view of a touch display device according to another embodiment of the inventive concept.
Figure 9:
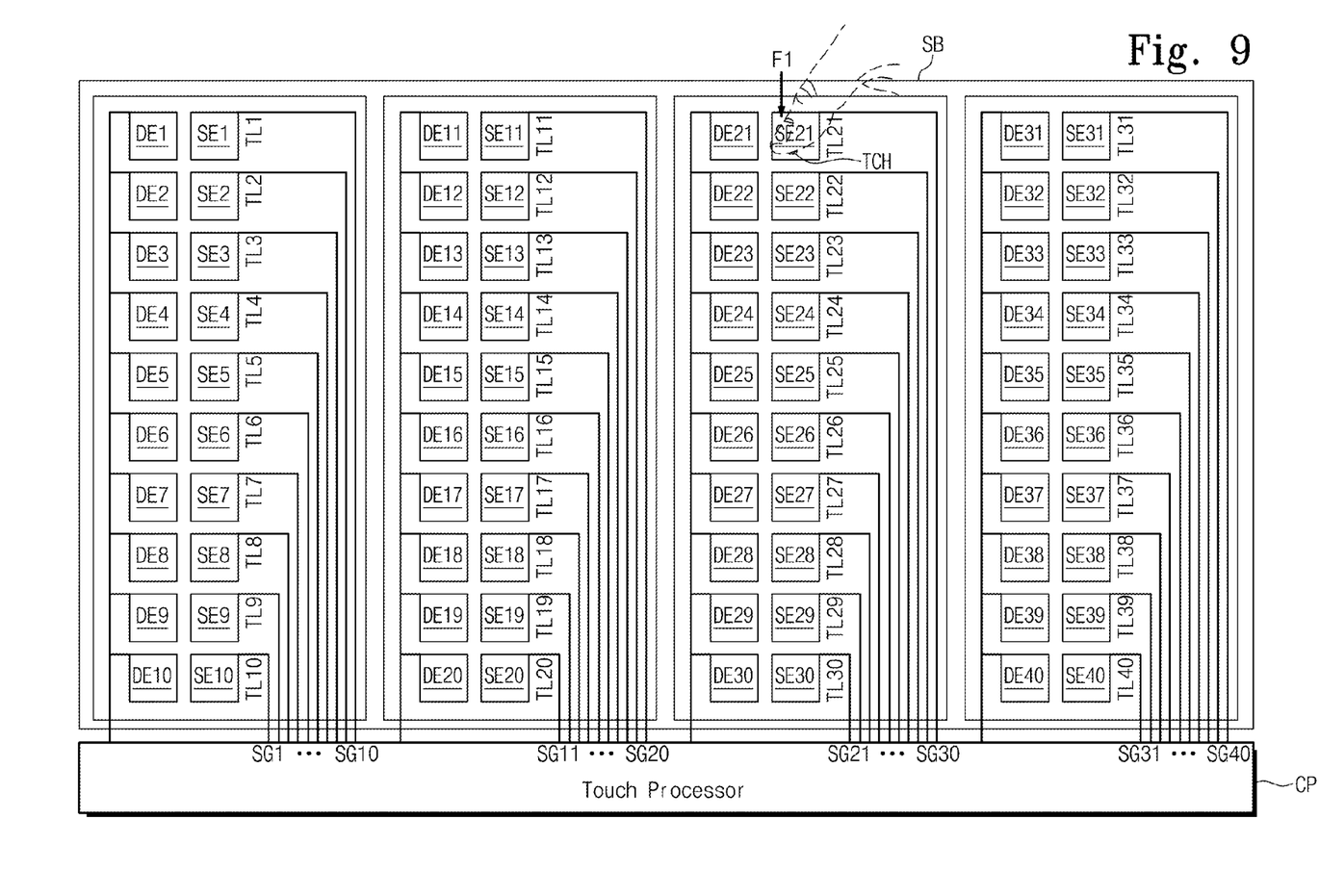
FIG. 9 is a top view of a touch screen panel in FIG. 8.

FIG. 8 is a cross-sectional view of a touch display device according to another embodiment of the inventive concept. FIG. 9 is a top view of the touch screen panel of FIG. 8. In FIG. 9, there is illustrated an example in which a touch TCH is generated at a touch substrate SB by a user. Herein, the touch TCH may be generated to be overlapped with a 21st sensing electrode SE21 in a plane view, and a touch force F1 corresponding to the touch TCH may be applied in a direction perpendicular to the touch screen SB.

Below, a touch display device 2000 according to another embodiment of the inventive concept will be described. The touch display device 2000 may be the same or substantially the same as a touch display device 1000 according to a previous embodiment of the inventive concept, except that driving electrodes DE are further included. Repetitive description of components that have already been described is omitted.

A touch screen panel 210 of the touch display device 2000 may include a touch substrate SB, sensing electrodes SE, driving electrodes DE, spacers SP, and a touch processor CP.

The sensing electrodes SE may be disposed on the touch substrate SB. The sensing electrodes SE may be spaced apart from one another. In FIG. 9, there is illustrated an example in which sensing electrodes SE1 to SE60 are arranged in a matrix of 4 rows and 10 columns.

The sensing electrodes SE1 to SE60 may be formed of a piezoresistive material having a resistance value that varies according to an applied force.

The driving electrodes DE may be disposed on the touch substrate SB. The driving electrodes DE may be spaced apart from one another. Capacitors may be formed between the sensing electrodes SE and the driving electrodes DE. In FIG. 9, there is illustrated an example in which driving electrodes DE1 to DE60 are arranged in a matrix of 4 rows and 10 columns. That is, the number of the driving electrodes DE1 to DE60 may be equal to that of the sensing electrodes SE1 to SE60, respectively.

A substantially constant voltage may be applied to the driving electrodes DE by the touch processor CP.

Referring to FIG. 9, an inherent capacitor may be formed between a 21st driving electrode DE21 and a 21st sensing electrode SE21. If a touch TCH by a user is generated to be overlapped with the 21st sensing electrode SE21, a touch capacitor may be formed between the user and the 21st sensing electrode SE21, and may be connected in parallel with the inherent capacitor. The combined capacitance of the touch and inherent capacitors may be larger than that of the inherent capacitor. A sensing time constant of a sensing signal SG21 provided to the 21st sensing electrode SE21 may be larger than when the touch TCH is not generated.

Figure 10:
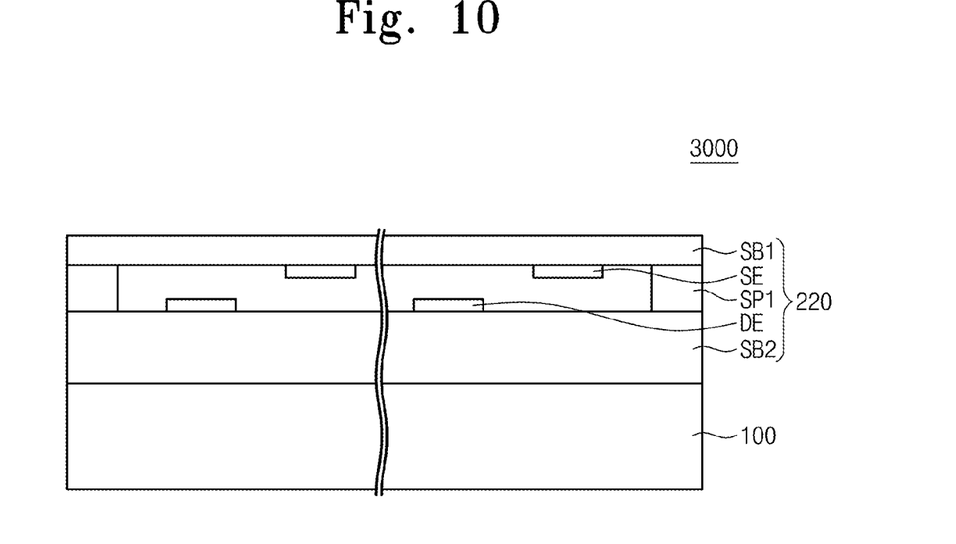
FIG. 10 is a perspective view of a touch display device according to still another embodiment of the inventive concept.

FIG. 10 is a perspective view of a touch display device according to still another embodiment of the inventive concept.

Below, a touch display device 3000 according to still another embodiment of the inventive concept will be described. The touch display device 3000 may be the same or substantially the same as that in FIG. 8 or 9 except for a touch substrate, sensing electrodes, and driving electrodes. In FIG. 10, a description on the remaining components except for the touch substrate, sensing electrodes, and driving electrodes may be omitted.

The touch screen panel 220 may include a first touch substrate SB1, a second touch substrate SB2, sensing electrodes SE, driving electrodes DE, spacers SP1, and a touch processor.

The first touch substrate SB1 may be used to receive a touch of a user. The first touch substrate SB1 may be formed of a flexible material such as plastic.

The first touch substrate SB1 may have a generally plate-like shape. As shown from a top, the first touch substrate SB1 may have a shape corresponding to a shape of the display panel 100. In FIG. 10, there is illustrated an example in which a shape of the first touch substrate SB1 is rectangular in plan view.

The second touch substrate SB2 may be formed to have a plate shape positioned opposite to the first touch substrate SB1. The second touch substrate SB2 may be connected with an upper surface of the display panel 100.

If the second touch substrate SB2 is formed of an insulating material, its flexibility may not be limited. In other words, the second touch substrate SB2 may be formed of a flexible material or a nonflexible material. Thus, the second touch substrate SB2 may be formed of plastic or glass.

The sensing electrodes SE may be disposed on the first touch substrate SB1. The sensing electrodes SE may be spaced apart from one another. The sensing electrodes SE may be formed of a piezoresistive material having a resistance value that varies according to an applied force.

The driving electrodes DE may be disposed on the second touch substrate SB2. The driving electrodes DE may be spaced apart from the sensing electrodes SE, and capacitors may be formed between the driving electrodes DE and the sensing electrodes SE, respectively.

The driving electrodes DE and the sensing electrodes SE may not be overlapped in plan view.

The spacers SP1 may be disposed between the first touch substrate SB1 and the second touch substrate SB2. The spacers SP1 may be used to maintain a cell gap between the first touch substrate SB1 and the second touch substrate SB2.

Heights of the spacers SP1 may be greater than those of the sensing electrodes SE. Thus, the sensing electrodes SE may be spaced apart from the display panel 100 in a height direction. A space between the first touch substrate SB1 and the second touch substrate SB2 may be filled by air.

Below, still another embodiment of the inventive concept will be described.

The touch display device 3000 may be the same or substantially the same as that according to previous embodiments of the inventive concept except for a touch processor. Below, a description on the remaining components except for a processor may be omitted.

Figure 11:
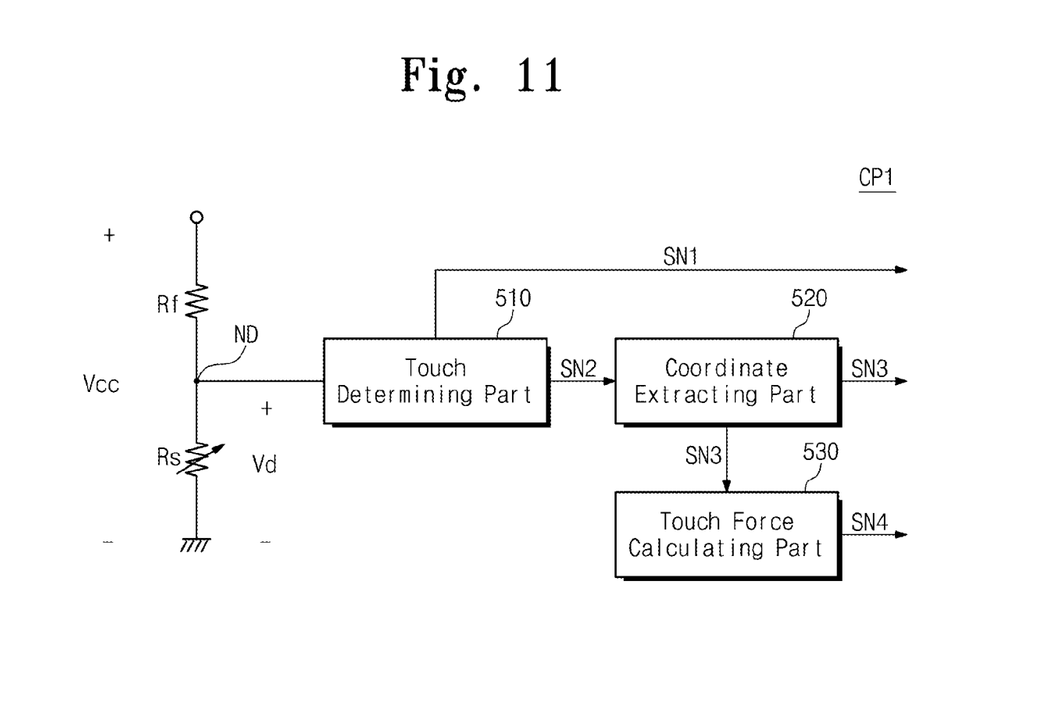
FIG. 11 is a diagram illustrating a touch processor according to still another embodiment of the inventive concept.
Figure 12:
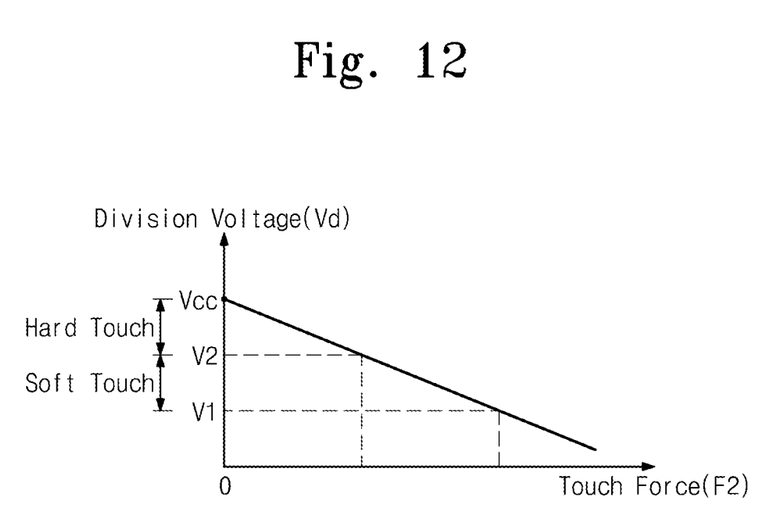
FIG. 12 is a graph illustrating a division voltage according to a touch force.

FIG. 11 is a diagram illustrating a touch processor according to still another embodiment of the inventive concept. FIG. 12 is a graph illustrating a division voltage according to a touch force.

Referring to FIGS. 11 and 12, a touch processor CP1 may sense a touch coordinate and a touch force based on resistance values of sensing electrodes SE illustrated in FIG. 3.

The touch processor CP1 may include an electrode resistor Rs, a reference resistor Rf, a touch determining part 510, a coordinate extracting part 520, and a touch force calculating part 530.

The electrode resistor Rs may have the same resistance value as that of each of the sensing electrodes SE1 to SE60 in FIG. 3. In more detail, the electrode resistor Rs may be an equivalent resistor of the sensing electrodes SE1 to SE60 seen from the touch processor CP1. That is, resistor Rs is an adjustable resistor whose resistance value is set to the resistance value of the sensing electrode that is receiving the touch force F1. The resistance value of the piezoresistive element is determined from the change in its sensing signal due to the touch, and Rs is set accordingly.

Thus, a resistance value of the electrode resistor Rs may vary when a resistance value of the sensing electrodes SE1 to SE60 is varied by a touch force.

The reference resistor Rf may be connected in series with the electrode resistor Rs, and may have a constant resistance value.

The resistors Rf and Rs may be connected in series between a setup voltage Vcc and a ground. One end of the reference resistor Rf may be connected to a reference potential Vcc, one end of the electrode resistor Rs may be grounded, and the other ends of the resistors Rf and Rs may be connected to each other.

The touch determining pan 510 may be connected to a node ND between the reference resistor Rf and the electrode resistor Rs.

The touch determining pan 510 may sense a division voltage Vd decided by dividing the reference potential Vcc using the resistors Rf and Rs. The division voltage Vd may vary according to a variation in a resistance value of the electrode resistor Rs.

The division voltage Vd may be decided according to the above-described equation 1.

The touch determining part 510 may determine a touch and a soft/hard touch by comparing the division voltage Vd to a predetermined reference voltage.

The reference voltage may include a first reference voltage V1 and a second reference voltage V2. That the division voltage Vd is higher than the first reference voltage V1 may indicate that a touch is generated. In the case that the division voltage Vd is higher than the first reference voltage V1 and lower than the second reference voltage V2, the touch determining part 510 may determine the touch to be a soft touch. In the case that the division voltage Vd is higher than the second reference voltage V2, the touch determining part 510 may determine the touch to be a hard touch.

Returning to FIG. 11, when a touch is not generated, the touch determining part 510 may provide a first control signal SN1 to a display panel 100.

When a touch is generated, the touch determining part 510 may provide the coordinate extracting part 520 with a second control signal SN2 including information associated with a soft/hard touch.

The coordinate extracting part 520 may extract the touch coordinate from a location of a sensing electrode corresponding to the division voltage. The coordinate extracting part 520 may provide the display panel 100 with a third control signal SN3 including information associated with the touch coordinate. The display panel 100 may receive the third control signal CN3 to convert it into an image such that information directed by the touch coordinate is displayed. Also, when the touch is a hard touch, the coordinate extracting part 520 may provide the third control signal SN3 to the touch force calculating part 530.

The touch force calculating part 530 may calculate the touch force F2 based on the division voltage Vd.

For example, in the case that a force is not applied to a sensing electrode, a resistance value of the electrode resistor Rs may be infinite. In the case that an infinite force is applied to the sensing electrode, a resistance value of the electrode resistor Rs may be zero. As a resistance value of the electrode resistor Rs varies, the division voltage Vd may vary between 0V and Vcc.

The touch force calculating part 530 may include a lookup table including force values respectively corresponding to voltage values between 0V and Vcc. The touch force calculating part 530 may read a touch force F2 corresponding to the division voltage Vd from the lookup table. However, the inventive concept is not limited thereto. For example, the touch force calculating part 530 may be configured to calculate the touch force F2 from the division voltage Vd using an appropriate coefficient.

The touch force calculating part 530 may provide the display panel 100 with a fourth control signal SN4 having information associated with the touch force. The display panel 100 may receive the fourth control signal SN4 to convert it into an image, such that information directed by the touch force is displayed.

With a display device of still another embodiment of the inventive concept, a touch coordinate and a touch force associated with a touch may be sensed using a division voltage based on a resistance value of a sensing electrode, without need of information associated with a time constant of a signal applied to a sensing electrode. That is, the change in resistance of the piezoresistive sensing electrode due to touch force is used to determine touch force, rather than time constant information.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A touch display device, comprising:
a display panel configured for displaying an image; and
a touch screen panel disposed on the display panel and configured to detect at least one touch,
wherein the touch screen panel comprises:
a touch substrate at which the touch can occur;
sensing electrodes provided on the touch substrate and spaced apart from one another, each of the sensing electrodes comprising a piezoresistive material having a resistance that varies according to a magnitude of an applied force; and
a touch processor electrically connected to the sensing electrodes,
wherein the touch processor is configured to:
determine a touch coordinate of the touch based on time constants of sensing signals applied to the sensing electrodes, and calculate a touch force of the touch based on resistance values of the sensing electrodes corresponding to the touch coordinate; and
wherein the touch processor comprises:
a signal providing unit configured to provide the sensing signals to the sensing electrodes; and
a signal processing unit configured to determine the time constants of the sensing signals so as to facilitate output of the touch coordinate and the touch force.

2. The touch display device of claim 1, wherein the sensing electrodes are spaced apart from one another and each have an island shape.

3. The touch display device of claim 1, wherein the piezoresistive material is carbon nanotube (CNT) or graphene.

4. The touch display device of claim 1, wherein the touch substrate comprises a flexible insulation material.

5. The touch display device of claim 1, wherein the signal processing unit comprises:
a touch determining part configured to determine the presence of the touch and to determine whether the touch is a soft touch or a hard touch, by comparing the time constants to a predetermined reference time constant;
a coordinate extracting part configured to extract the touch coordinate from locations of sensing electrodes whose respective sensing signals have time constants corresponding to the touch; and
a touch force calculating part configured to calculate the touch force based on a resistance value of a sensing electrode corresponding to the touch coordinate.

6. The touch display device of claim 5, wherein the signal processing unit is further configured to calculate the touch coordinate and the touch force when the touch is a hard touch, and to calculate the touch coordinate when the touch is a soft touch.

7. The touch display device of claim 5, wherein the touch force calculating part comprises:
an electrode resistor configured to provide resistance values of ones of the sensing electrodes;
a reference resistor connected in series to the electrode resistor and having a substantially constant resistance value; and
a force sensing part connected to a node between the electrode resistor and the reference resistor,
wherein the electrode resistor and the reference resistor are configured to divide a reference voltage applied thereto, and the force sensing part is configured to calculate the touch force based on the divided voltage.

8. The touch display device of claim 1, wherein the touch screen panel further comprises:
touch lines formed on the touch substrate and connecting the touch processor to respective ones of the sensing electrodes.

9. The touch display device of claim 1, wherein the sensing electrodes are arranged in a matrix of i rows and j columns (i and j being natural numbers).

10. The touch display device of claim 9, wherein ones of the touch lines connected to sensing electrodes of a kth column of sensing electrodes (k being a natural number satisfying i≤k<j) are disposed between the kth column and a (k+1)th column of sensing electrodes that is adjacent to the kth column.

11. The touch display device of claim 1, wherein the touch screen panel further comprises a spacer disposed between the touch substrate and the display panel to maintain a gap between the touch substrate and the display panel.

12. The touch display device of claim 11, wherein a height of the spacer is greater than that of each of the sensing electrodes.

13. A touch display device, comprising:
a display panel configured to display an image; and
a touch screen panel disposed on the display panel and configured to sense at least one touch,
wherein the touch screen panel comprises:
a touch substrate at which the touch can occur;
sensing electrodes provided on the touch substrate and spaced apart from one another, each of the sensing electrodes comprising a piezoresistive material having a resistance that varies according to a magnitude of an applied force;
driving electrodes provided on the touch substrate and spaced apart from the sensing electrodes so as to form capacitors from respective ones of the sensing electrodes and ones of the driving electrodes; and
a touch processor electrically connected to the sensing electrodes,
wherein the touch processor is configured to:
extract a touch coordinate of the touch based on time constants of sensing signals applied to the sensing electrodes, and
calculate a touch force of the touch based on resistance values of the sensing electrodes corresponding to the touch coordinate; and
wherein the touch processor comprises:
a signal providing unit configured to provide the sensing signals to the sensing electrodes; and
a signal processing unit configured to determine the time constants of the sensing signals so as to facilitate output of the touch coordinate and the touch force.

14. The touch display device of claim 13, wherein the touch substrate comprises a flexible insulation material.

15. The touch display device of claim 13, wherein the signal processing unit comprises:

a touch determining part configured to determine the presence of the touch and to determine whether the touch is a soft touch or a hard touch, by comparing the time constants to a predetermined reference time constant;

a coordinate extracting part configured to extract the touch coordinate from locations of sensing electrodes whose respective sensing signals have time constants corresponding to the touch; and a touch force calculating part configured to calculate the touch force based on a resistance value of a sensing electrode corresponding to the touch coordinate.

16. The touch display device of claim 15, wherein the touch force calculating part comprises:

an electrode resistor configured to provide resistance values of ones of the sensing electrodes;

a reference resistor connected in series to the electrode resistor and having a substantially constant resistance value; and a force sensing part connected to a node between the electrode resistor and the reference resistor, wherein the electrode resistor and the reference resistor are configured to divide a reference voltage applied thereto, and the force sensing part is configured to calculate the touch force based on the divided voltage.

17. The touch display device of claim 13, wherein the signal processing unit is further configured to calculate the touch coordinate and the touch force when the touch is a hard touch, and to calculate the touch coordinate when the touch is a soft touch.

18. The touch display device of claim 13, wherein the piezoresistive material is carbon nanotube (CNT) or graphene.

19. The touch display device of claim 13, wherein the touch processor is electrically connected to the driving electrodes, and wherein the touch processor is configured to apply a substantially constant voltage to the driving electrodes.

20. A touch display device, comprising:

a display panel configured to display an image; and a touch screen panel disposed on the display panel and configured to sense at least one touch, wherein the touch screen panel comprises:

a first touch substrate at which the touch can occur;

a second touch substrate positioned opposite to the first touch substrate and coupled to an upper surface of the display panel;

sensing electrodes provided on the first touch substrate and spaced apart from one another, each of the sensing electrodes comprising a piezoresistive material having a resistance that varies according to a magnitude of an applied force;

driving electrodes provided on the second touch substrate and spaced apart from the sensing electrodes so as to form capacitors from respective ones of the sensing electrodes and ones of the driving electrodes; and a touch processor electrically connected to the sensing electrodes, wherein the touch processor is configured to:

extract a touch coordinate of the touch based on time constants of sensing signals applied to the sensing electrodes, and calculate a touch force of the touch based on resistance values of the sensing electrodes corresponding to the touch coordinate; and wherein the touch processor comprises:

a signal providing unit configured to provide the sensing signals to the sensing electrodes; and a signal processing unit configured to determine the time constants of the sensing signals so as to facilitate output of the touch coordinate and the touch force.

\* \* \* \* \*